Aug. 13, 1929. J. H. FOX 1,724,703
PLATE GLASS TRANSFER APPARATUS
Filed Oct. 29, 1923 3 Sheets-Sheet 1
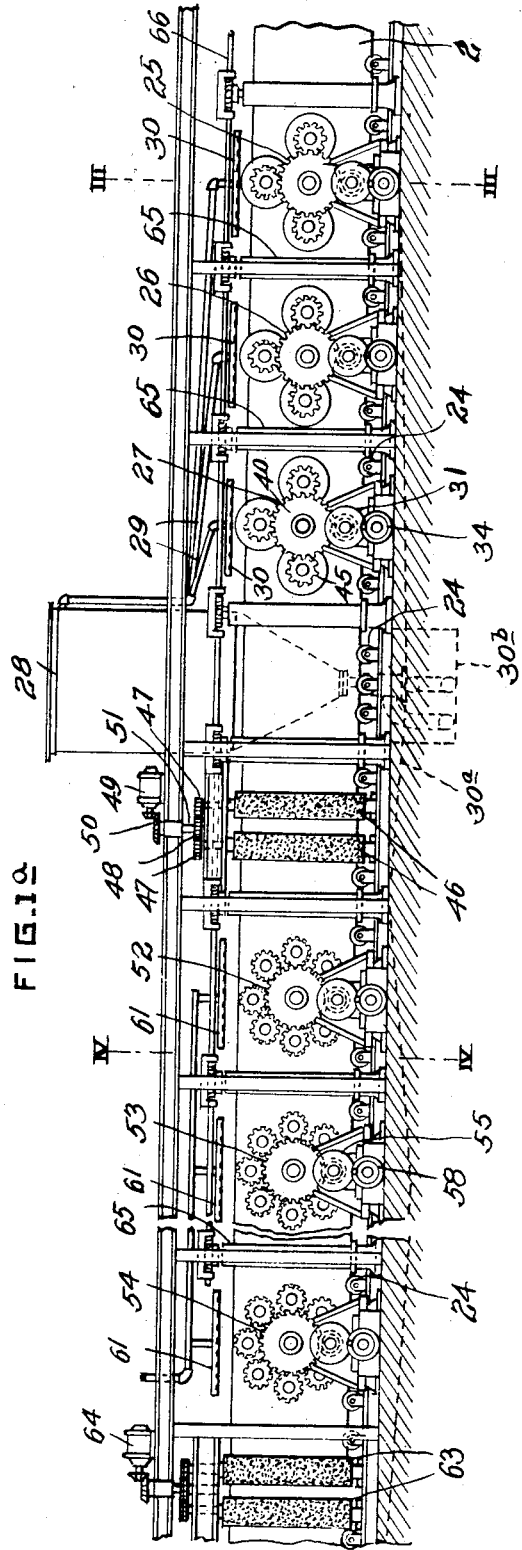
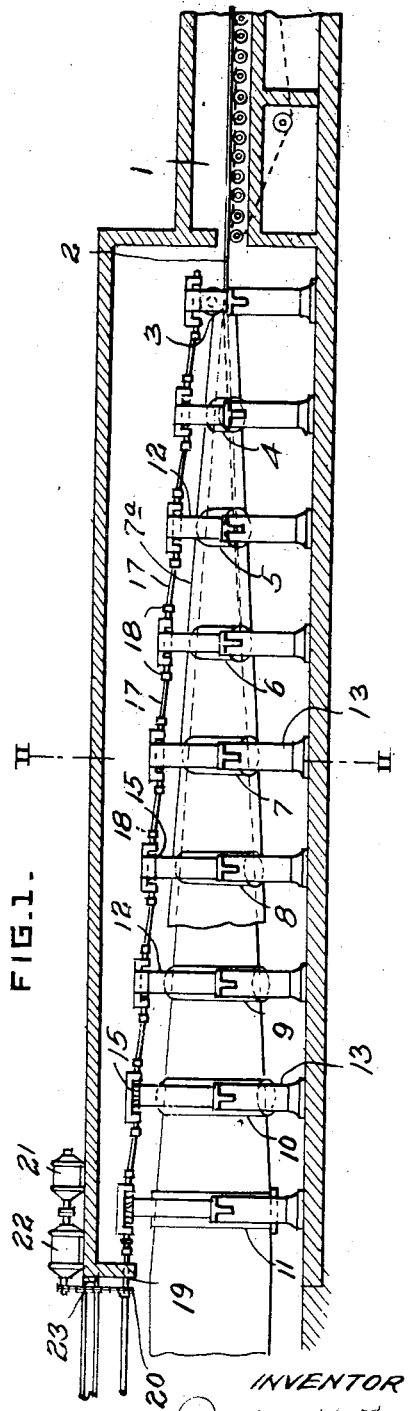
INVENTOR
John H. Fox
by
James C. Bradley
atty

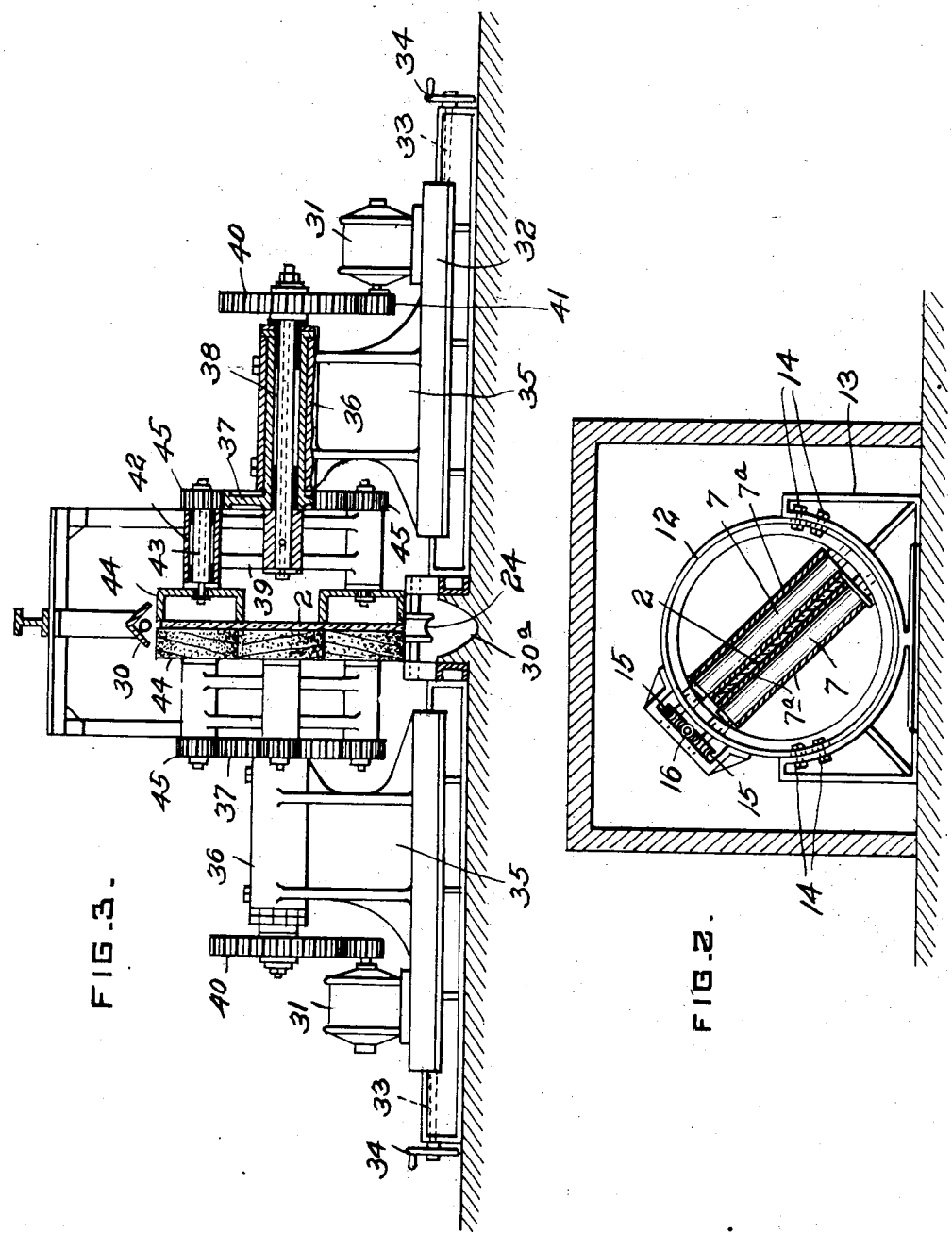

Aug. 13, 1929.  J. H. FOX  1,724,703
PLATE GLASS TRANSFER APPARATUS
Filed Oct. 29, 1923   3 Sheets-Sheet 3
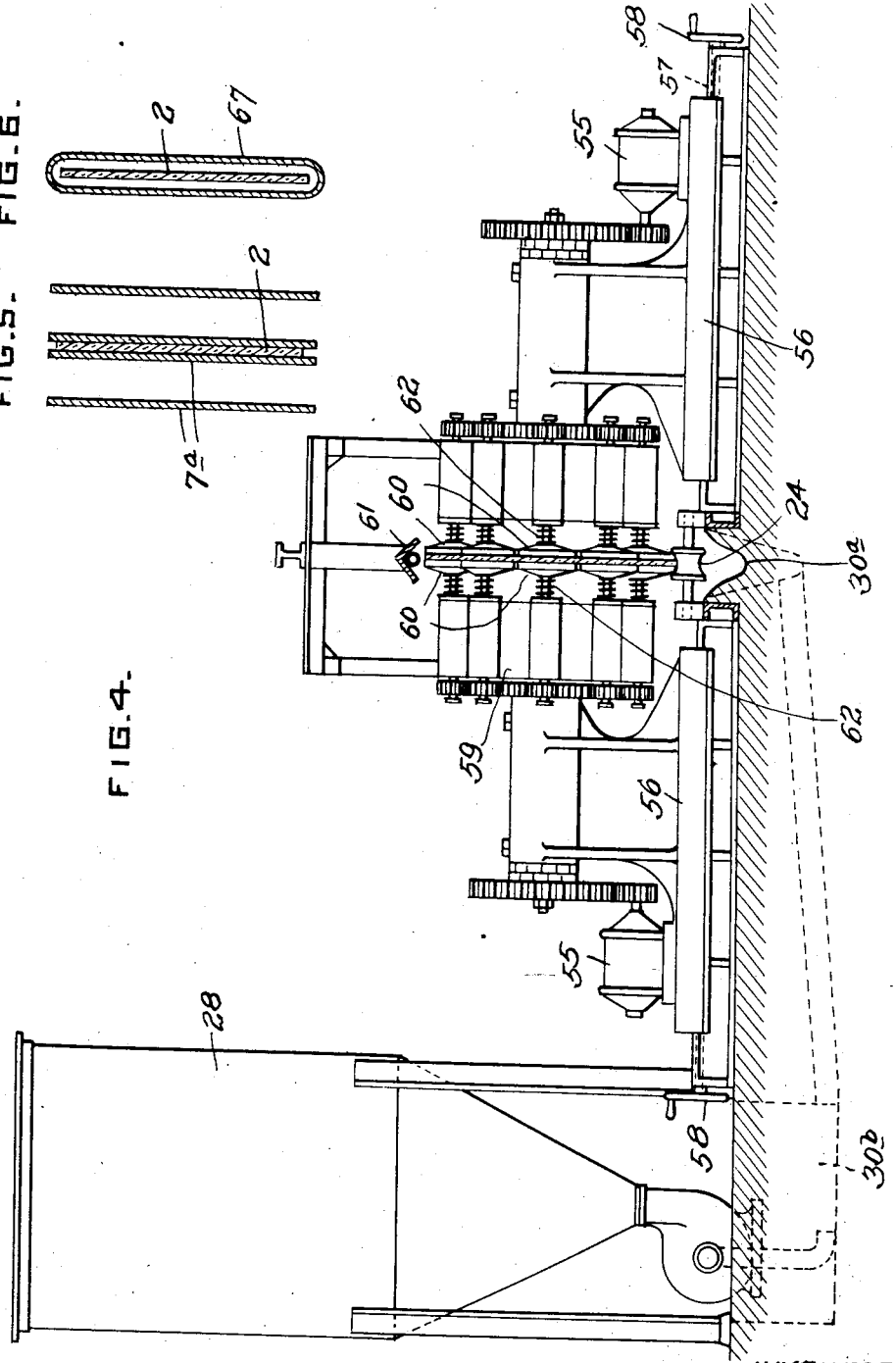

Patented Aug. 13, 1929.

1,724,703

UNITED STATES PATENT OFFICE.

JOHN H. FOX, OF PITTSBURGH, PENNSYLVANIA, ASSIGNOR TO PITTSBURGH PLATE GLASS COMPANY, A CORPORATION OF PENNSYLVANIA.

PLATE-GLASS-TRANSFER APPARATUS.

Application filed October 29, 1923. Serial No. 671,398.

The invention relates to a process and apparatus for surfacing plate glass which is formed in a continuous ribbon. It has for its primary object the cheapening of the glass surfacing operation (grinding and polishing) by eliminating the requirement for cutting it into sections and securing the glass to the tops of surfacing tables by plaster or other means as has heretofore been done. It has for its further object the shortening of the surfacing operation by the provision of procedure and means whereby the glass is ground and polished on its two surfaces simultaneously. One embodiment of the invention is illustrated in the accompanying drawings wherein:

Figure 1 is a side elevation of the first portion of the apparatus. Fig. 1ª is a side elevation of the second portion of the apparatus and forming a continuation thereof. Figs. 2, 3, 4 and 5 are sections on the lines II—II, III—III, IV—IV and V—V of Fig. 1. And Fig. 6 is a section through a modification.

The glass sheet or ribbon which is to be surfaced is preferably formed from a tank in the manner indicated in the application of Frederick Gelstharp, Serial No. 656,441 and after its formation is passed through a leer, the outlet end of which is indicated by the reference numeral 1, such leer also being of the roller type shown in the Gelstharp application referred to. After the ribbon 2, which is now set and fully annealed emerges from the leer, it is gradually twisted from a horizontal plane to a vertical plane by passing between a plurality of pairs of driven rolls 3, 4, 5, 6, 7, 8, 9, 10 and 11, the number of pairs of rolls and the distance required in which to bend the glass from a horizontal to a vertical plane depending upon conditions, but in all cases, the bending is so gradual that the strain upon the glass is not sufficient to fracture it. The twisting rolls are each carried in an annular framework 12 mounted for rotary adjustment in the semi-annular base 13, the opposing flanges of the members 12 and 13 being slotted to receive the bolts 14 so that the angle of adjustment of the rolls may be varied to suit requirements. The rolls are mounted in suitable bearings carried by the frame 12 and are provided at their ends with the worm wheels 15 driven by a worm 16. The worms are coupled together in series by the shaft sections 17 which have at each end the universal joints 18 so that the line shaft which is thus formed is made perfectly flexible to take care of the varying angles of adjustment of the sets of twisting rolls. The end line shaft section 19 carries a sprocket wheel 20 which is driven from the motor 21 through the reducing gearing in the casing 22 and the sprocket chain 23. In order to guide the glass between the pairs of rolls and prevent any interruption in case the glass breaks, the pairs of endless belts 7ª are employed on opposite sides of the glass, such belts passing between all of the pairs of rolls and around the rear thereof as indicated in Figs. 2 and 5.

After the glass ribbon passes the twisting rolls, it is supported at its lower edge by a series of V rollers 24 which serve to support the ribbon during the surfacing operation. The glass is first acted upon by a series of grinding machines 25, 26 and 27, three only of which are shown, but it will be understood that a larger number are employed, the number being dependent upon the speed at which the ribbon of glass is carried past the machines. The invention is not limited to the use of any particular type of grinding machine, the only limitation being that these machines must be arranged opposite each other so that the force applied on one side of the sheet will counterbalance that applied on the other side, thus eliminating the danger of breakage. These machines preferably have runners of cast iron to which a mixture of abrasive and water is supplied. The abrasive is preferably sand for the first grinding machines and emery for the final ones, a sand grader 28 being shown with pipes 29 leading to perforated pipes 30 above the various machines. If desired, the abrasive may be fed through the runner spindles as in Patent 637,306. As is common in all grinding operations, the grader will supply the coarsest abrasive to the first grinding machine and successively finer grades to the succeeding machines. The drainage from the grinders is returned through the ditch or trough 30ª to the sump 30ᵇ, from which it is pumped up to the grader 28 for reuse.

The grinding machines are all the same in construction so that a description of one will be sufficient for all. As indicated in Fig. 3, the entire machine including the driving motor 31 is mounted upon a movable base 32 so that the grinding runners may be adjusted toward and from the glass ribbon 2. This adjustment is accomplished by means of a threaded rod 33 extending through a suitable nut in the base and provided with a hand wheel 34. Mounted upon the base is a standard 35 provided with a tubular portion 36 to which is keyed the stationary gear 37. Mounted to rotate in the tubular portion 36 is the shaft 38 which carries at its inner end the runner frame 39 and at its outer end the spur gear 40. This gear is driven from the motor 31 by means of the pinion 41 mounted on the shaft of the motor. The runner frame 39 consists of four arms at the end of each of which is a bearing 42 in which is mounted a runner shaft 43. The inner end of this shaft carries the cup shaped runner 44, while the outer end is provided with a pinion 45 meshing with a stationary gear 37. It will be seen that the arrangement provides a planetary drive for the runners, the frame 39 being rotated upon its shaft 38 and each of the runners being rotated about their axes 43 by reason of the engagement of their pinions 45 with the fixed gear 37.

After the ribbon has been ground and smoothed by the sand and emery, it is carried past the pairs of vertical brushes 46 to which water is supplied and which serve to free the glass from any abrasive preliminary to the polishing operation. These brushes are provided at their upper ends with the gears 47 engaged by a pinion 48 and this pinion is driven from the motor 49 through the intermediary of the bevel gears 50 and the shaft 51 to which the gear 48 is keyed.

The glass is now ready for polishing and passes between a series of polishing machines 52, 53, and 54. Here as in the case of the grinders a much larger number of polishers are preferably used than shown, the number depending upon the speed at which the glass is moved forward and other conditions. Also as in the case of the grinders, the polishing machines including their motors 55 are mounted upon the bases 56 for movement toward and from the glass, this being accomplished by means of threaded shafts 57 rotated by means of hand wheels 58. The same method of driving the polishing blocks is employed in these machines as is done with the grinding machines heretofore described, the only difference being that the polishing frame 59 carries eight polishing runners 60 instead of the four grinding runners used upon the grinding machines.

The runners of blocks 60 are faced with felt and the polishing is accomplished by means of a mixture of rouge and water supplied to the perforated pipes 61 located above the machines. In order to provide for the application of yielding pressure to the glass, the shafts carrying the polishing blocks are mounted for longitudinal movement relative to the frame 59 which carries them and springs 62 are provided yieldingly pressing the polisher blocks forward.

In order to assist in moving the ribbon along between the grinding and polishing runners, a plurality of pairs of vertical rolls 65 are employed. These rolls are mounted in suitable bearings and are driven from the line shaft 66 which forms a continuation of the flexible line shaft and is driven from the motor 21. The line shaft 66 is provided with worms corresponding to the worms 16 which engage worm wheels secured to the ends of the roll shafts. These rolls and the rolls 3, 4, 5, etc. are preferably covered with yielding material such as rubber, cloth or asbestos which yieldingly engages the glass ribbon and serves to move it along.

In order to guide the ribbon between the rolls 3, 4, 5, etc. the guide casings 67 shown in cross section in Fig. 6 may be used instead of the endless belts 7a, such casings being of sheet metal with their surfaces relatively close to the glass but out of contact therewith so as to avoid retarding the movement of the ribbon and to avoid imposing any binding effect thereon. These casings serve to guide the ribbon from one set of rolls to the next when the operation is started, and perform a similar function in case the ribbon breaks during the bending operation.

After the glass passes the polishing machines, it is acted upon by other cleaning brushes 63 to which water is supplied, such brushes being driven from a motor 64, similar to the drive described in connection with the brushes 46. The glass is then cut into sections of suitable length and removed to storage racks, thus completing the operation. A great advantage of the operation over one in which the glass is cut in sections as it emerges from the leer, lies in the fact that the labor and expense of laying the glass upon the tables for surfacing and then releasing it and turning it over for the second surfacing operation are entirely eliminated. A further advantage, incident to grinding while the ribbon is in a vertical position lies in the fact that the two sides can be surfaced at the same time, thus reducing by one half the time ordinarily required for completing the surfacing operation. Other advantages will be readily apparent to those skilled in the art.

What I claim is:

1. A process for producing and surfacing sheet glass which consists in forming the glass in a continuous, forwardly moving ribbon, annealing the ribbon as it moves forward, gradually turning the ribbon from a horizontal to a vertical plane after it is annealed, and surfacing the opposite sides of the glass at the same time as it moves forward in a vertical plane.

2. Apparatus for surfacing a continuously formed ribbon of glass after it is annealed, which consists of a series of pairs of rolls with the planes of the passes therebetween successively departing more and more from that of the first pass and with that of the last pass at right angles thereto, and a plurality of pairs of surfacing machines arranged along the path of the ribbon with the members of each pair in opposition.

3. Apparatus for surfacing a continuously formed ribbon of glass after it is annealed, which consists of a series of pairs of rolls with the planes of the passes therebetween successively departing more and more from that of the first pass and with that of the last pass at right angles thereto, a plurality of pairs of surfacing machines arranged along the path of the ribbon with the members of each pair in opposition, and means for driving the machines.

In testimony whereof, I have hereunto subscribed my name this 24 day of Oct., 1923.

JOHN H. FOX.